(12) United States Patent
Kanda

(10) Patent No.: US 11,938,773 B2
(45) Date of Patent: Mar. 26, 2024

(54) ELECTRICALLY POWERED SUSPENSION SYSTEM

(71) Applicant: HONDA MOTOR CO., LTD., Tokyo (JP)

(72) Inventor: Ryoma Kanda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 236 days.

(21) Appl. No.: 17/545,528

(22) Filed: Dec. 8, 2021

(65) Prior Publication Data

US 2022/0185052 A1 Jun. 16, 2022

(30) Foreign Application Priority Data

Dec. 11, 2020 (JP) .................. 2020-206178

(51) Int. Cl.
*B60G 17/015* (2006.01)
*B60G 17/0165* (2006.01)
*B60G 17/06* (2006.01)

(52) U.S. Cl.
CPC ..... *B60G 17/0157* (2013.01); *B60G 17/0165* (2013.01); *B60G 17/06* (2013.01);
(Continued)

(58) Field of Classification Search
CPC ... B60G 17/0157; B60G 17/018; B60G 17/06
See application file for complete search history.

(56) References Cited

U.S. PATENT DOCUMENTS 5,638,275 A * 6/1997 Sasaki ............... B60G 17/0152
280/5.507
5,810,384 A * 9/1998 Iwasaki ............... B60G 17/018
280/5.514
(Continued)

FOREIGN PATENT DOCUMENTS

CN 105946496 A 9/2016
CN 107010068 A 8/2017
(Continued)

OTHER PUBLICATIONS

Office Action received in corresponding Japanese application No. 2020-206178 dated Aug. 2, 2022 with English translation (6 pages).
(Continued)

*Primary Examiner* — Long T Tran
(74) *Attorney, Agent, or Firm* — Rankin, Hill & Clark LLP

(57) ABSTRACT

An electrically powered suspension system includes: an electromagnetic actuator provided between a vehicle body and a wheel of a vehicle and configured to generate a damping force for damping vibration of the vehicle body; a wheel speed sensor that detects a wheel speed of the wheel; a wheel speed variation amount calculation part that calculates a wheel speed variation amount on the basis of wheel speed detection values detected by the wheel speed sensor; a 3D gyro sensor that detects sprung state amounts including a sprung pitching action of the vehicle; and a wheel speed variation amount correction part that estimates a variation component in the wheel speed variation amount on the basis of a sprung pitch amount and corrects the wheel speed variation amount so as to reduce the estimated variation component.

2 Claims, 8 Drawing Sheets

(52) U.S. Cl.
CPC ...... *B60G 2202/44* (2013.01); *B60G 2204/62* (2013.01); *B60G 2400/0512* (2013.01); *B60G 2400/202* (2013.01); *B60G 2400/208* (2013.01); *B60G 2500/104* (2013.01); *B60G 2600/182* (2013.01); *B60G 2800/162* (2013.01); *B60G 2800/916* (2013.01)

(56) References Cited

U.S. PATENT DOCUMENTS

| | | | |
|---|---|---|---|
| 6,208,920 | B1 | 3/2001 | Izawa et al. |
| 2014/0005889 | A1* | 1/2014 | Hayakawa ....... B60G 17/01933 701/37 |
| 2015/0290995 | A1* | 10/2015 | Kanda ................ B60G 17/0182 701/37 |
| 2016/0107498 | A1* | 4/2016 | Yamazaki .......... B60G 17/0162 701/37 |
| 2017/0101087 | A1 | 4/2017 | Momose |
| 2018/0134111 | A1 | 5/2018 | Toyohira et al. |
| 2018/0361813 | A1* | 12/2018 | Ohno ................. B60G 17/0157 |
| 2019/0030981 | A1* | 1/2019 | Furuta ................ B60G 21/0553 |
| 2019/0241038 | A1* | 8/2019 | Katsuyama ...... B60G 17/01908 |

FOREIGN PATENT DOCUMENTS

| | | |
|---|---|---|
| CN | 110654195 A | 1/2020 |
| DE | 19811350 A1 | 10/1998 |
| JP | 2007-261477 A | 10/2007 |
| JP | 2012-210020 A | 10/2012 |
| JP | 2013-010428 A | 1/2013 |
| JP | 2013-107628 A | 6/2013 |
| JP | 2014-008887 A | 1/2014 |
| JP | 2016-022830 A | 2/2016 |
| JP | 2017-165282 A | 9/2017 |
| JP | 2018-158729 A | 10/2018 |

OTHER PUBLICATIONS

Chinese Office Action received in corresponding Chinese application No. 202111505852.2 dated Jul. 8, 2023, 12 pages.

* cited by examiner

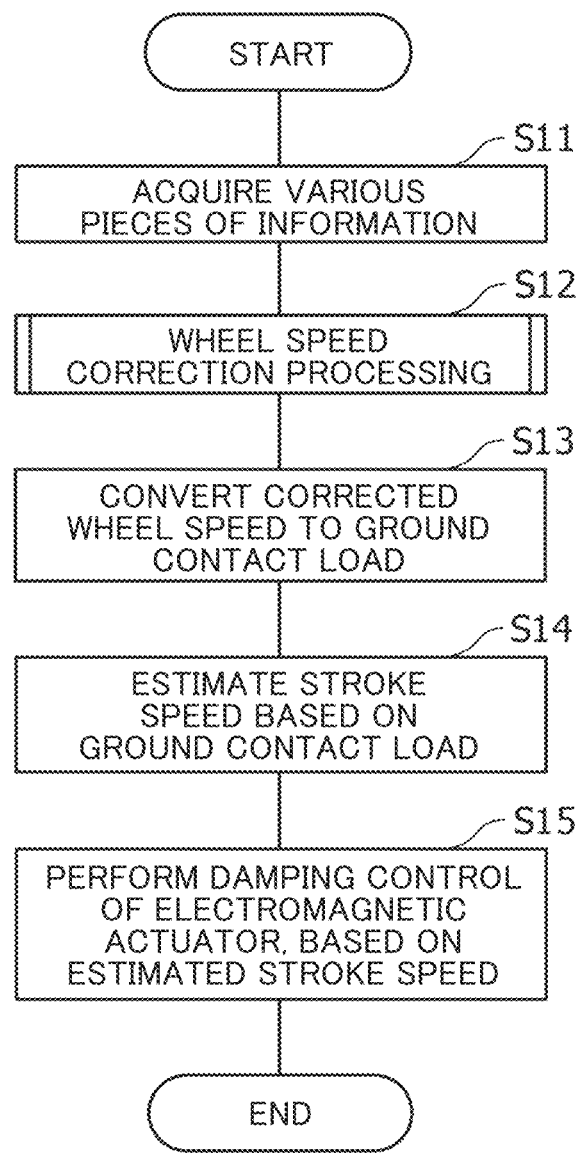

ELECTRICALLY POWERED SUSPENSION SYSTEM

CROSS-REFERENCE TO RELATED APPLICATIONS

The present application claims the foreign priority benefit under Title 35 U.S.C. § 119 of Japanese Patent Application No. 2020-206178, filed on Dec. 11, 2020, in the Japan Patent Office, the disclosure of which is herein incorporated by reference in its entirety.

BACKGROUND OF THE INVENTION

1. Field of the Invention

The present invention relates to an electrically powered suspension system including an actuator that is provided between a vehicle body and a wheel of a vehicle and generates a damping force for damping vibration of the vehicle body.

2. Description of Related Art

The applicant of the present disclosure has disclosed an electrically powered suspension system with an actuator that is provided between a (sprung) vehicle body and a (unsprung) wheel of a vehicle and generates a damping force for damping vibration of the vehicle body (see Japanese Patent Publication No. 2016-22830, hereinafter referred to as Patent Literature 1).

The electrically powered suspension system disclosed in Patent Literature 1 includes: wheel speed sensors that detect the wheel speeds of respective wheels; wheel speed variation amount calculation means that calculates wheel speed variation amounts on the basis of the wheel speed detection values detected by the wheel speed sensors; state amount calculation means that calculates vehicle state amount information including at least one of a sprung speed of the vehicle body and stroke speeds of suspensions, on the basis of the wheel speed variation amounts; a control means that controls damping forces of variable damping force dampers (actuators) on the basis of at least one of the stroke speeds and the sprung speed calculated by the state amount calculation means.

The electrically powered suspension system disclosed in Patent Literature 1 requires acquiring, as the vehicle state amount information, information on the stroke speeds and the sprung speed, in order to appropriately perform the damping control on the actuators. To acquire such vehicle state amount information, the electrically powered suspension system disclosed in Patent Literature 1 employs a wheel speed variation amount having a high correlation with the vehicle state amount.

However, fluctuations (variations) occur in the wheel speed variation amount when a turning (steering) operation is performed by the driver.

In view of this, the electrically powered suspension system disclosed in Patent Literature 1 corrects the wheel speed variation amounts so as to reduce variation components which are included in the wheel speed variation amounts and are due to the influence of the steering. With this, the vehicle state amount information is estimated taking into account the fluctuations that occur in the wheel speed variation amounts during the turning. On the basis of high accuracy vehicle state amount information which has been estimated in this way, damping control is performed on the actuators.

With the electrically powered suspension system disclosed in Patent Literature 1, high accuracy damping control can be performed even when the vehicle is turning.

However, the electrically powered suspension system disclosed in Patent Literature 1 could possibly suffer from a decrease in the estimation accuracy of the vehicle state amounts (stroke speeds, sprung speed) in a case where the vehicle is traveling on a wavy road which causes pitching actions of the vehicle.

This is due to the following reasons. A wheel speed correlation value (wheel speed signal) is used as basic information for estimating the vehicle state amounts. The wheel speed sensors, which each detect a wheel speed signal, are each arranged at an unsprung position, i.e., are each arranged under a spring member of a suspension. In a case where the vehicle is traveling a wavy road which causes pitching actions of the vehicle, pitching occurs under the spring members of the suspensions due to the pitching actions of the vehicle. In this case, the wheel speed signal has a component superimposed therein corresponding to an unsprung pitch rate. That is, a noise signal is mixed in the original wheel speed signal. Here, the unsprung pitch rate means a pitching amount per a unit time under the spring member of the suspension. The unsprung pitch rate has a dimension of deg/s.

This makes it difficult to perform damping control of the actuators with high accuracy. Consequently, the ride quality of the vehicle could be deteriorated.

In short, there remains room for improvement in the electrically powered suspension system disclosed in Patent Literature 1 in that the ride quality of the vehicle can be improved even when the vehicle is traveling on a wavy road which causes pitching actions of the vehicle.

SUMMARY OF INVENTION

The present invention has been made in view of the above-described circumstances and it is an object of the invention to provide an electrically powered suspension system that can keep the ride quality at a comfortable level even when a vehicle is traveling on a wavy road which causes pitching actions of the vehicle.

To achieve the object, an electrically powered suspension system of an embodiment of the present invention includes: an actuator provided between a vehicle body and a wheel of a vehicle and configured to generate a damping force for damping vibration of the vehicle body; a stroke speed estimation part configured to estimate a stroke speed of a suspension; and a damping control part configured to perform damping control of the actuator on the basis of the stroke speed estimated by the stroke speed estimation part. The electrically powered suspension system further includes: a wheel speed detection part provided at an unsprung position of the vehicle and configured to detect a wheel speed of the wheel; a wheel speed variation amount calculation part configured to calculate a wheel speed variation amount on the basis of wheel speed detection values detected by the wheel speed detection part; a sprung state amount detection part provided at a sprung position of the vehicle and configured to detect sprung state amounts including sprung pitch-related information relevant to a sprung pitching action; and a wheel speed variation amount correction part configured to: calculate a sprung pitch amount on the basis of the sprung pitch-related information detected by the sprung state amount detection part; estimate an variation component in the wheel speed variation amount on the basis of the calculated sprung pitch amount; and to correct the wheel speed variation amount calculated by the wheel speed variation amount calculation part so as to reduce the estimated variation component in the wheel speed variation amount. The stroke speed estimation part estimates the stroke speed of the suspension on the basis of the wheel speed variation amount corrected by the wheel speed variation amount correction part.

With the electrically powered suspension system of the embodiment can keep the ride quality at a comfortable level even when a vehicle is traveling on a wavy road which causes pitching actions of the vehicle.

BRIEF DESCRIPTION OF THE DRAWINGS

FIG. 6 is a flowchart for explaining operations of the electrically powered suspension system according to the embodiment of the present invention.

DETAILED DESCRIPTION OF THE EMBODIMENTS

Figure 1:
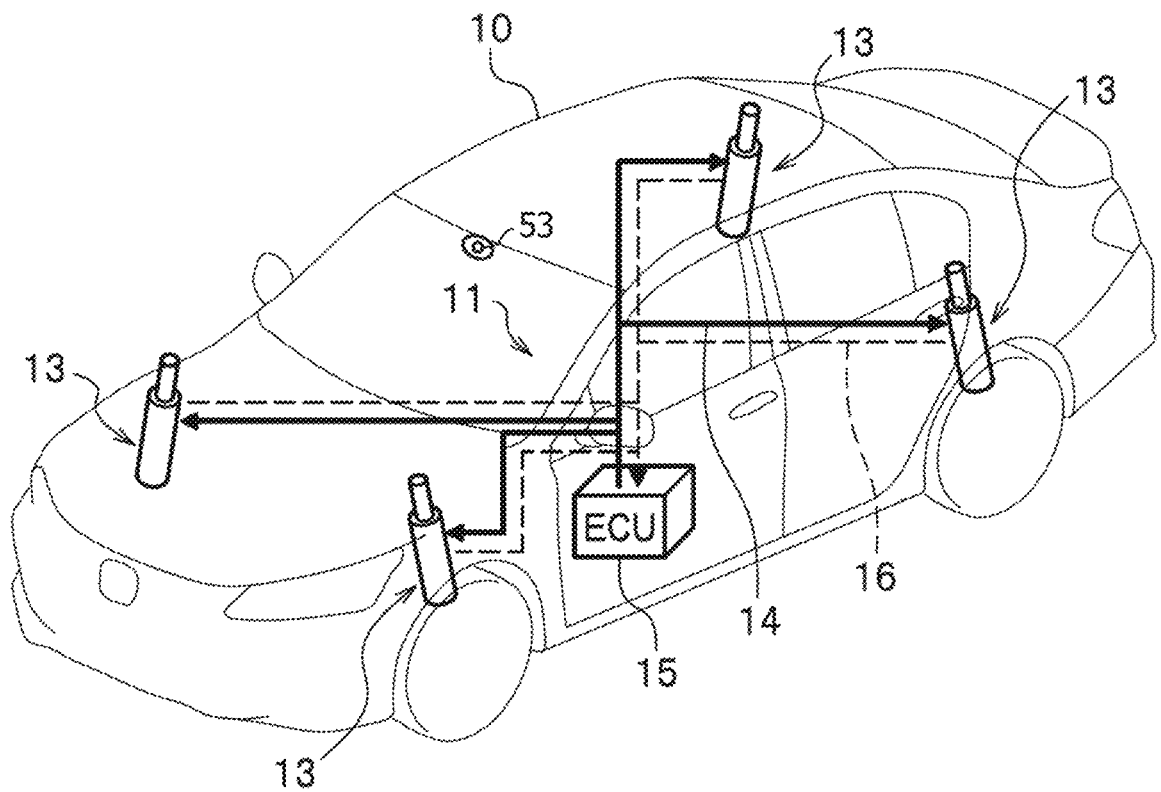
FIG. 1 is a view illustrating an entire configuration of an electrically powered suspension system according to an embodiment of the present invention.

An electrically powered suspension system 11 according to an embodiment of the present invention will be described in detail below with reference to the drawings as appropriate.

Note that, in the drawings discussed hereinafter, basically, members having the same function are denoted by the same reference sign. In this case, as a general rule, a redundant description will be omitted. For convenience of explanation, sizes and shapes of components may be schematically illustrated with deformation or in an exaggerated manner.

Basic Configuration Common to Electrically Powered Suspension Systems 11 According to Embodiments of the Present Invention Firstly, a description will be given of a basic configuration common to the electrically powered suspension systems 11 according to the embodiments of the present invention with reference to FIGS. 1 and 2.

FIG. 1 is a view illustrating an entire configuration common to the electrically powered suspension systems 11 according to the embodiments of the present invention. FIG. 2 is a partial cross-sectional view of an electromagnetic actuator 13 included in the electrically powered suspension system 11.

The electrically powered suspension system 11 of the embodiment according to the present invention has a function to perform damping control of a plurality of electromagnetic actuators 13 on the basis of target damping forces and the like to generate damping loads (damping forces) for attenuation operations and expansion/contraction operations of the electromagnetic actuators 13, thereby keeping the ride quality at a comfortable level even while the vehicle 10 is traveling on a wavy road which cause pitching actions of the vehicle 10.

Note that the term "damping force" used herein means a force to restrain the vibration of a vehicle body and is a concept covering the attenuation force and the expansion/contraction force related to the electromagnetic actuator 13.

As illustrated in FIG. 1, to provide the above-described function, the electrically powered suspension system 11 according to the embodiment of the present invention includes a plurality of electromagnetic actuators 13 respectively provided to the wheels of the vehicle 10, and a damping control ECU 15. The plurality of electromagnetic actuators 13 and the damping control ECU 15 are connected to each other with respective electric power supply lines 14 (see the solid lines in FIG. 1), through which damping control electric power is supplied from the damping control ECU 15 to the plurality of electromagnetic actuators 13, and with respective signal lines 16 (see the broken lines in FIG. 1), through which damping control signals of electric motors 31 (see FIG. 2) are transmitted from the plurality of electromagnetic actuators 13 to the damping control ECU 15.

In the present embodiment, a total of four electromagnetic actuators 13 are provided respectively to the front wheels (front left wheel and front right wheel) and the rear wheels (rear left wheel and rear right wheel). The electromagnetic actuators 13 provided respectively to the wheels are each separately controlled to damp vibration in conjunction with expansion/contraction operations for the corresponding wheel.

In the embodiment of the present invention, unless otherwise noted, the plurality of electromagnetic actuators 13 each have a common configuration. As such, the configuration of one electromagnetic actuator 13 will be described below as a representative of the plurality of electromagnetic actuators 13.

Figure 2:
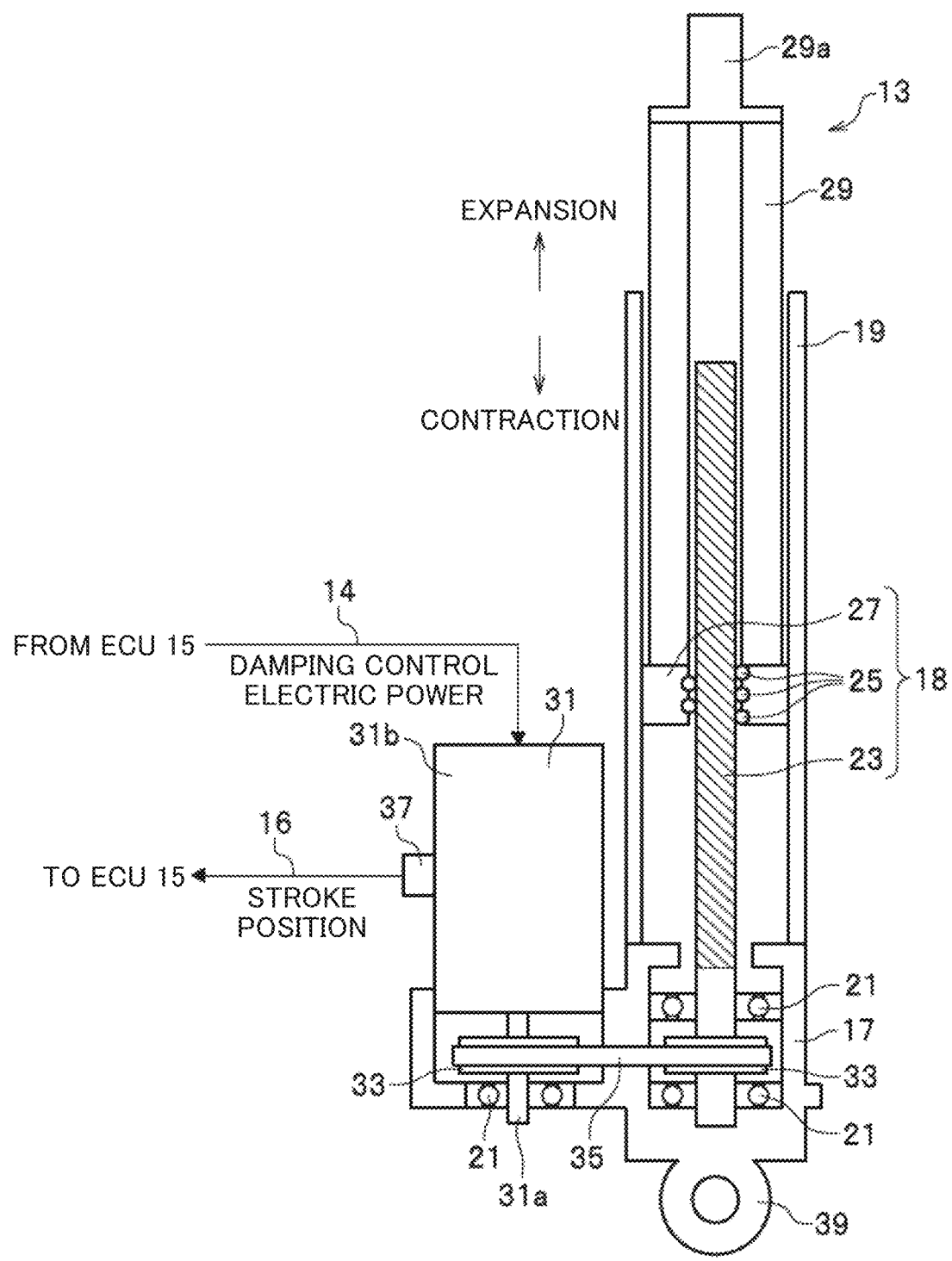
FIG. 2 is a partial cross-sectional view of an electromagnetic actuator included in the electrically powered suspension system.

As illustrated in FIG. 2, the electromagnetic actuator 13 includes a base housing 17, an outer tube 19, a ball bearing 21, a ball screw shaft 23, a plurality of balls 25, a nut 27, and an inner tube 29.

The base housing 17 supports a proximal end side of the ball screw shaft 23 via the ball bearing 21 such that the ball screw shaft 23 is rotatable about its axis. The outer tube 19 is provided on the base housing 17 and accommodates a ball screw mechanism 18 including the ball screw shaft 23, the plurality of balls 25, and the nut 27. The plurality of balls 25 roll along a screw groove of the ball screw shaft 23. The nut 27 is engaged with the ball screw shaft 23 via the plurality of balls 25 and converts a rotational motion of the ball screw shaft 23 into a linear motion. The inner tube 29, which is coupled to the nut 27, moves along the axial directions of the outer tube 19 together with the nut 27.

In order to transmit a rotational driving force to the ball screw shaft 23, the electromagnetic actuator 13 includes the electric motor 31, a pair of pulleys 33, and a belt member 35, as illustrated in FIG. 2. The electric motor 31 is provided on the base housing 17 in parallel to the outer tube 19. The pulleys 33 are respectively attached to a motor shaft 31a of the electric motor 31 and the ball screw shaft 23. The belt member 35, which is for transmitting the rotational driving force of the electric motor 31 to the ball screw shaft 23, is wrapped around the pair of pulleys 33.

The electric motor 31 is provided with a resolver 37 that detects a rotation angle signal of the electric motor 31. The rotation angle signal of the electric motor 31, detected by the resolver 37, is transmitted to the damping control ECU 15 via the signal line 16. The rotational driving of the electric motor 31 is controlled in accordance with the damping control electric power which is supplied by the damping control ECU 15 to the corresponding one of the plurality of electromagnetic actuators 13 via the electric power supply line 14.

As illustrated in FIG. 2, the present embodiment employs a layout in which the motor shaft 31a of the electric motor 31 and the ball screw shaft 23 are arranged substantially in parallel and connected with each other, thereby shortening the axial dimension of the electromagnetic actuator 13. Alternatively, another layout may be employed in which, for example, the motor shaft 31a of the electric motor 31 and the ball screw shaft 23 are coaxially arranged and connected to each other.

As illustrated in FIG. 2, the electromagnetic actuator 13 according to this embodiment of the present invention has a connecting portion 39 provided at a lower end of the base housing 17. The connecting portion 39 is connected and fixed to an unsprung member 47 (see FIG. 5C) on the wheel side, non-limiting examples of which unsprung member 47 include a lower arm and a knuckle. On the other hand, an upper end portion 29a of the inner tube 29 is connected and fixed to a sprung member 49 (see FIG. 5C) on the vehicle body side, non-limiting examples of which sprung member 49 include a strut tower portion.

In short, the electromagnetic actuator 13 is arranged in parallel with a spring member 48 (see FIG. 5C) provided between the vehicle body and a wheel of the vehicle 10.

The electromagnetic actuator 13 configured as described above operates as follows. Specifically, consider a case where, for example, a thrust related to upward vibration is inputted into the connecting portion 39 from the wheel side of the vehicle 10. In such a case, the inner tube 29 and the nut 27 attempt to descend together with respect to the outer tube 19, to which the thrust relating to the upward vibration has been applied. In response to this, the ball screw shaft 23 attempts to rotate in a direction to follow the descending of the nut 27. In this event, the electric motor 31 is caused to generate a rotational driving force in a direction in which the rotational driving force impedes the descending of the nut 27. This rotational driving force of the electric motor 31 is transmitted to the ball screw shaft 23 via the belt member 35.

By exerting a reaction force (damping force) on the ball screw shaft 23 against the thrust related to the upward vibration in this manner, the vibration being to be transmitted from the wheel side to the vehicle body side is attenuated.

[Internal Configuration of Damping Control ECU 15]

Next, a description will be given of internal and peripheral configurations of the damping control ECU 15 included in the electrically powered suspension system 11 according to the embodiment of the present invention, with reference to FIG. 3.

Figure 3:
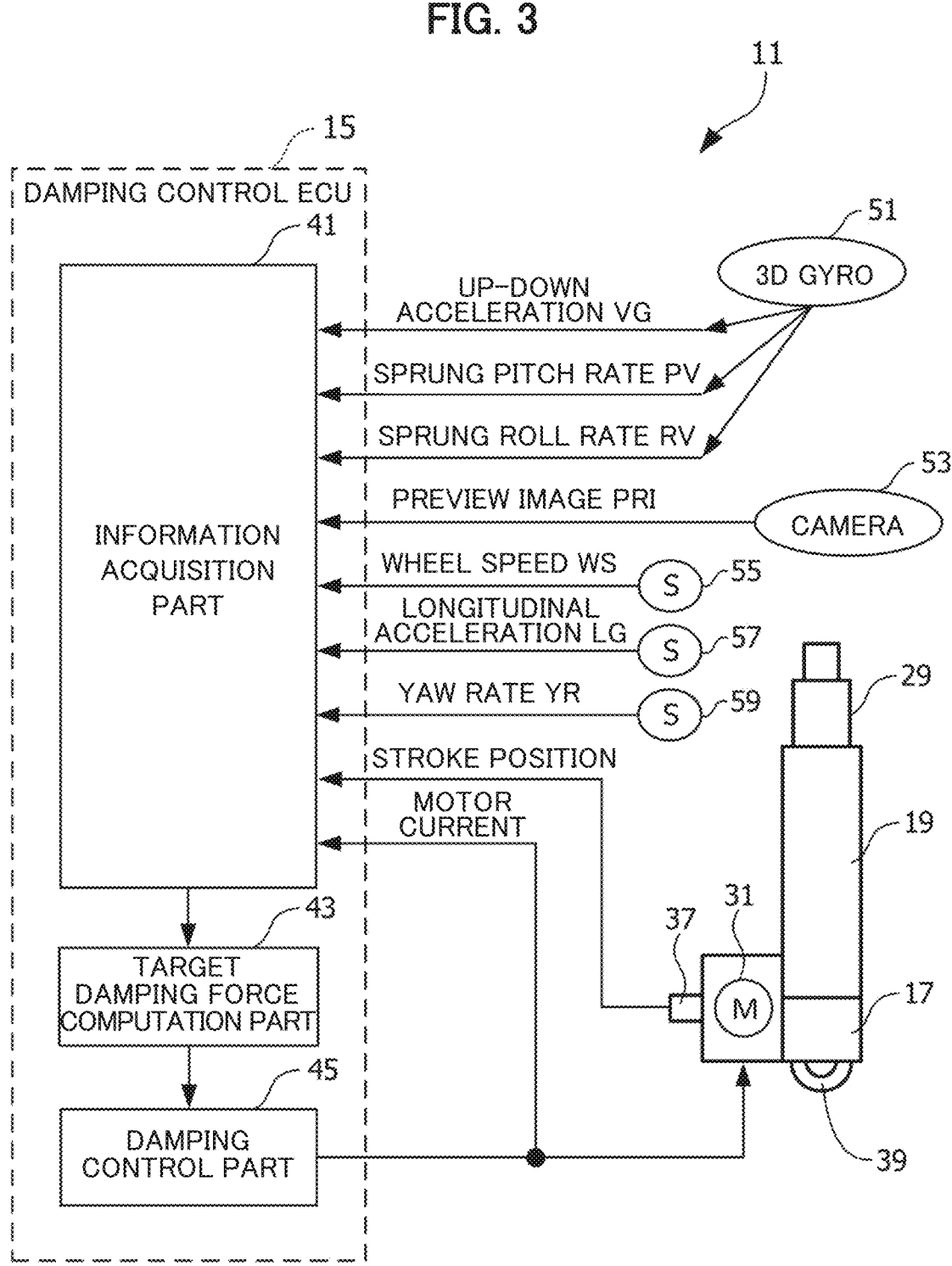
FIG. 3 is a block diagram illustrating internal and peripheral parts of a damping control ECU (Electronic Control Unit) included in the electrically powered suspension system.

FIG. 3 is a block diagram illustrating internal and peripheral parts of the damping control ECU 15 included in the electrically powered suspension system 11 according to the embodiment of the present invention.

Electrically Powered Suspension System 11 According to Embodiment of the Present Invention The damping control ECU 15 included in the electrically powered suspension system 11 according to the embodiment of the present invention includes a microcomputer that performs various arithmetic processing operations. The damping control ECU 15 performs damping control on each of the plurality of electromagnetic actuators 13 on the basis of the rotation angle signal of the electric motor 31, detected by the resolver 37, the target damping force, and the like. With this, the damping control ECU 15 has a damping control function that generates a damping load for an attenuation operation or an expansion/contraction operation of the electromagnetic actuator 13.

In order to implement such a damping control function, the damping control ECU 15 includes an information acquisition part 41, a target damping force computation part 43, and a damping control part 45, as illustrated in FIG. 3.

As illustrated in FIG. 3, the information acquisition part 41 acquires the rotation angle signal of the electric motor 31, detected by the resolver 37, as time-series information indicative of stroke positions.

As illustrated in FIG. 3, the information acquisition part 41 also acquires time-series information on each of an up-down acceleration VG, a sprung pitch rate PV, and a sprung roll rate RV. The information on the up-down acceleration VG, the sprung pitch rate PV, and the sprung roll rate RV may be acquired on the basis of, for example, information from a 3D gyro sensor 51 provided in the vehicle 10, as illustrated in FIG. 3. The information on the up-down acceleration VG may be acquired on the basis of information from an up-down acceleration sensor (not illustrated).

The 3D gyro sensor 51 corresponds to the "sprung state amount detection part" of the present invention.

The information acquisition part 41 also acquires time-series information on a front road surface condition of a road surface ahead of the vehicle 10 in the direction of advance as preview image information PRI. The preview image information PRI may be acquired, for example, on the basis of image information captured by a camera 53 provided on the vehicle 10.

The camera 53 has an optical axis inclined downward relative to the forward direction of the vehicle 10 and takes images of an area in the advance direction of the vehicle 10. Examples of the camera 53 suitably used herein include, but not limited to, Complementary Metal Oxide Semiconductor (CMOS) cameras and Charge Coupled Device (CCD) cameras. The camera 53 is disposed, for example, in the vicinity of a rearview mirror in the cabin of the vehicle 10.

The preview image information PRI on the road surface ahead of the host vehicle 10, captured by the camera 53, is transmitted to the information acquisition part 41 of the damping control ECU 15 through a communication medium.

As illustrated in FIG. 3, the information acquisition part 41 further acquires time-series information on each of a wheel speed WS, a longitudinal acceleration LG, a yaw rate YR, a stroke position of the electromagnetic actuator 13, and a motor current for the electric motor 31. The information on the wheel speed WS may be acquired by a wheel speed sensor 55. The information on the longitudinal acceleration LG and the yaw rate YR may be acquired by a longitudinal acceleration sensor 57 and a yaw rate sensor 59, respectively.

The pieces of information on the up-down acceleration VG, the sprung pitch rate PV, the sprung roll rate RV, the preview image PRI, the wheel speed WS, the longitudinal acceleration LG, the yaw rate YR, the stroke position of the electromagnetic actuator 13, and the motor current for the electric motor 31, acquired by the information acquisition part 41, are transmitted to the target damping force computation part 43.

As illustrated in FIG. 3, the target damping force computation part 43 has a function of figuring out a target damping force, which is a target value for an attenuation operation or expansion/contraction operation of the electromagnetic actuator 13, by computation using the various pieces of information acquired by the information acquisition part 41. Specifics of the function of the target damping force computation part 43 are described in detail later.

The damping control part 45 computes a target current value that can produce the target damping force figured out by the target damping force computation part 43. The damping control part 45 then performs a drive control on the electric motor 31 included in each of the plurality of electromagnetic actuators 13 such that the motor current for the electric motor 31 follows the target current value calculated. The plurality of electromagnetic actuators 13 are controlled separately to perform damping control with respective electric motors 31.

[Internal Configuration of Target Damping Force Computation Part 43 Included in Damping Control ECU 15]

Next, a description will be given of an internal configuration of the target damping force computation part 43 included in the damping control ECU 15 of the electrically powered suspension system 11 according to the embodiment of the present invention, with reference to FIGS. 4 and 5A to 5C as appropriate.

Figure 4:
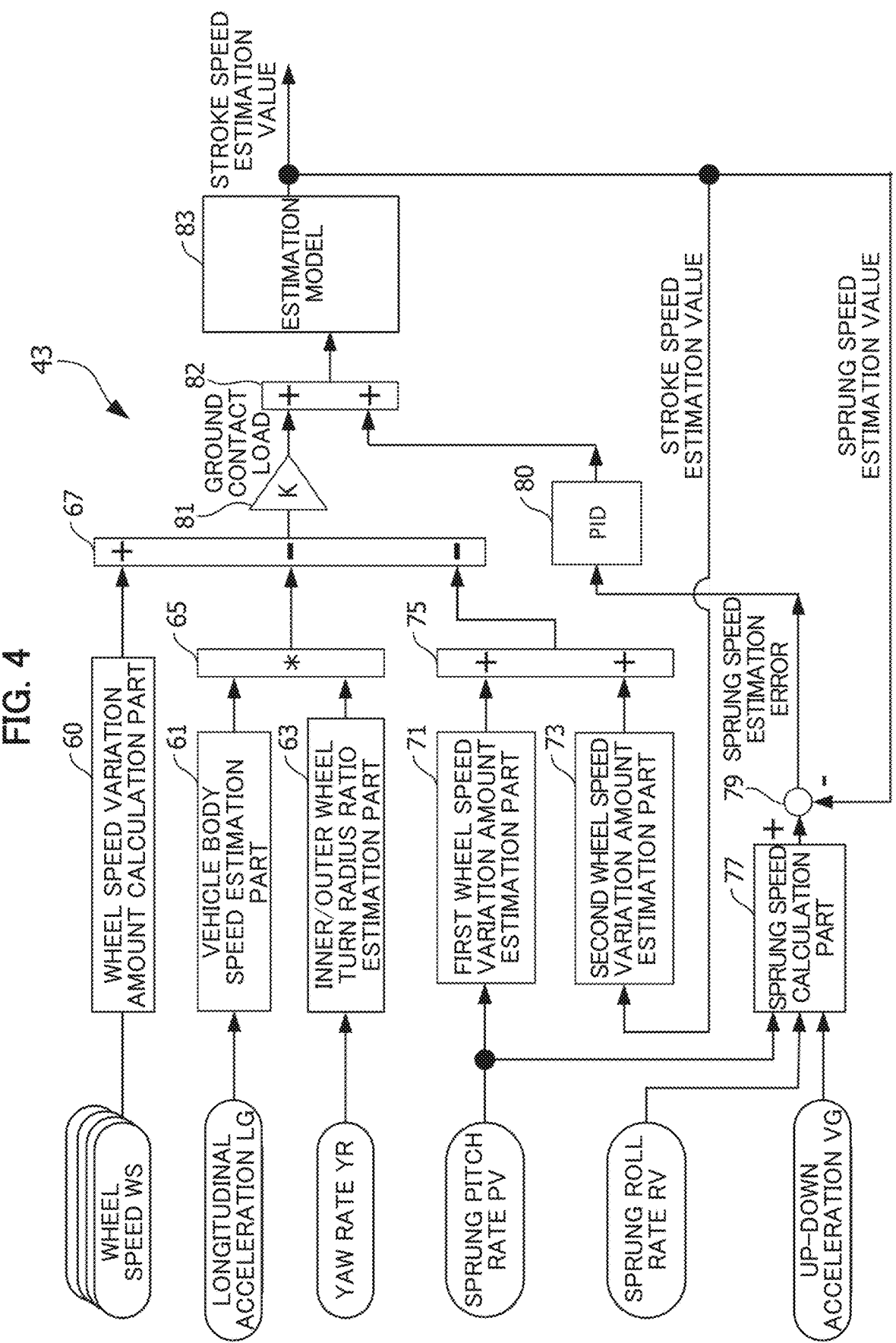
FIG. 4 is a block diagram conceptually illustrating an internal configuration of a target damping force computation part included in the damping control ECU.
Figure 5A:
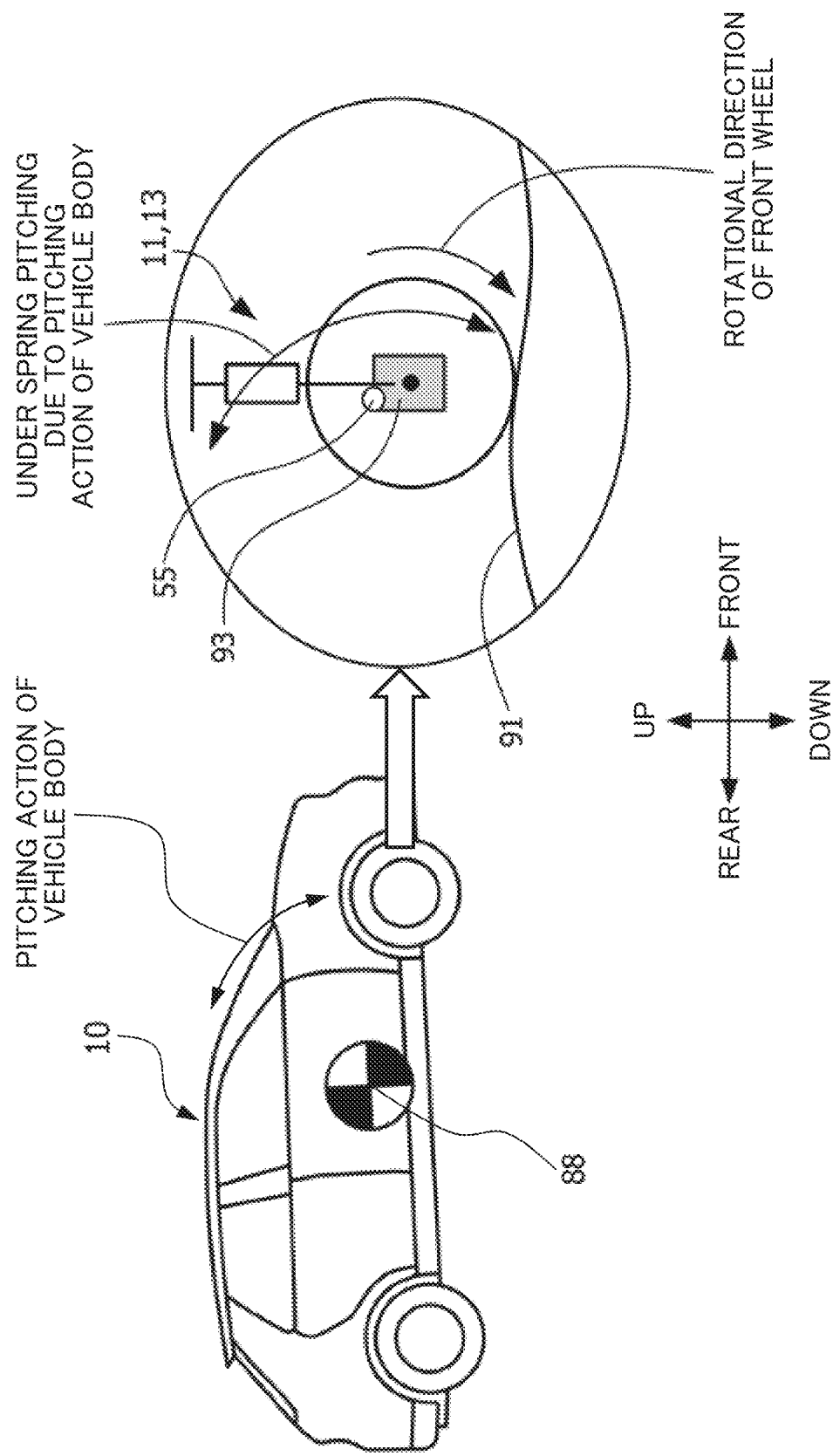
FIG. 5A is an explanatory diagram conceptually representing the mechanism that causes a fluctuation in the wheel speed variation amount due to a sprung pitch amount.
Figure 5B:
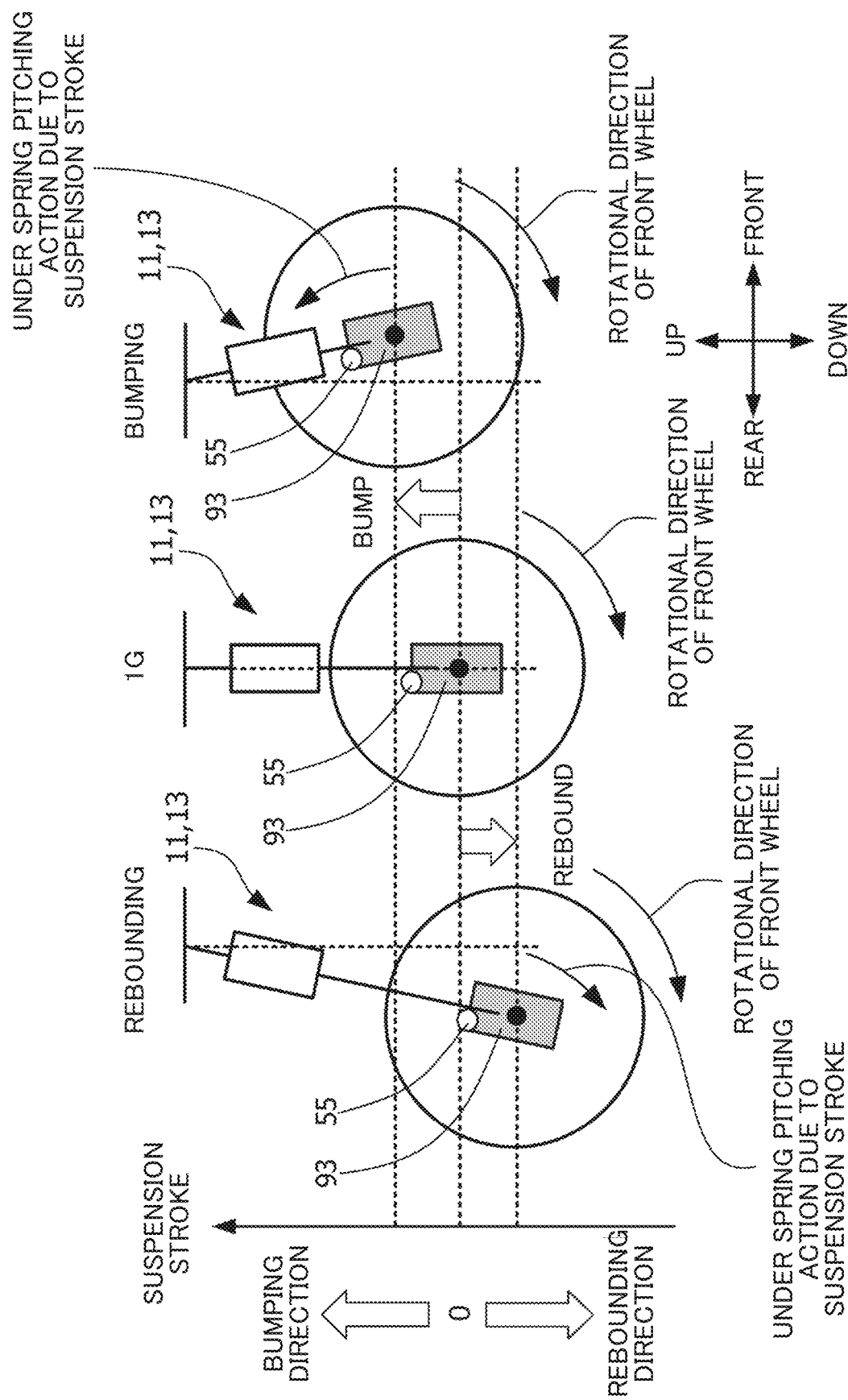
FIG. 5B is an explanatory diagram conceptually representing the mechanism that causes a fluctuation in the wheel speed variation amount due to a stroke of a suspension.
Figure 5C:
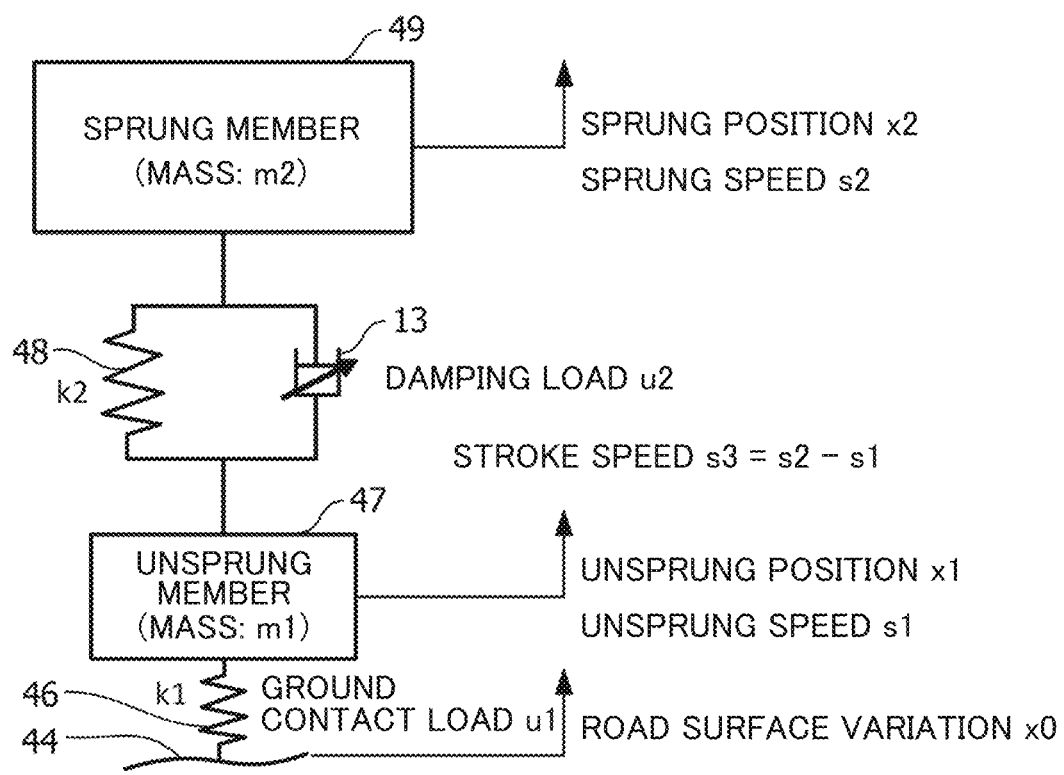
FIG. 5C is a conceptual diagram for explaining an estimation model implemented in the target damping force computation part of the damping control ECU.

FIG. 4 is a block diagram conceptually illustrating an internal configuration of the target damping force computation part 43 included in the damping control ECU 15. FIG. 5A is an explanatory diagram conceptually representing the mechanism that causes a fluctuation in the wheel speed variation amount due to a sprung pitch amount. FIG. 5B is an explanatory view conceptually representing the mechanism that causes a fluctuation in the wheel speed variation amount due to a suspension stroke. FIG. 5C is a conceptual diagram for explaining an estimation model 83 implemented in the target damping force computation part 43 of the damping control ECU 15.

As illustrated in FIG. 4, the target damping force computation part 43 included in the damping control ECU 15 of the electrically powered suspension system 11 includes: a wheel speed variation amount calculation part 60, a vehicle body speed estimation part 61, an inner/outer wheel turn radius ratio estimation part 63, a multiplier part 65, an adder/subtractor part 67, a first wheel speed variation amount estimation part 71, a second wheel speed variation amount estimation part 73, an adder part 75, a sprung speed calculation part 77, a subtractor part 79, a PID 80, a conversion part 81, an adder part 82, and the estimation model 83.

The wheel speed variation amount calculation part 60, illustrated in FIG. 4, has a function to calculate a wheel speed variation amount on the basis of wheel speed detection values detected by the corresponding wheel speed sensor 55.

The information indicative of the wheel speed variation amount calculated by the wheel speed variation amount calculation part 60 is transmitted to the multiplier part 65 provided at a succeeding stage.

The term "wheel speed variation amount" of the present invention is defined as follows:

A wheel speed variation amount is a time-series difference between the wheel speed values of two consecutive wheel speed samples separated by a predetermined time unit, which two consecutive wheel speed samples are given in a time-series data of wheel speed detected by the wheel speed sensor 55 and sampled at predetermined time unit intervals.

For example, when a wheel speed at time t(x) is denoted WS (t(x)); a wheel speed at time t(x−1) is denoted WS(t(x−1)), where x is a natural number, the wheel speed variation amount at time t(x) ΔWS(t(x)) is given by the following formula:

Wheel speed variation amount $\Delta WS(t(x)) = WS(t(x)) - WS(t(x-1))$

In addition, the term "fluctuation (variation) in the wheel speed variation amount" means a fluctuation (variation) that occurs due to some factor (e.g., a sprung pitch amount or the occurrence of a suspension stroke) in the wheel speed variation amount with respect to the original wheel speed variation amount ΔWS which is considered as a reference.

In addition, the term "variation component" of the wheel speed variation amount means a component related to the fluctuation (variation) of the wheel speed variation amount.

Returning to FIG. 4, the description of the target damping force computation part 43 continues.

The vehicle body speed estimation part 61 has a function to estimate a vehicle body speed, which is a correction amount for the wheel speed WS, on the basis of the longitudinal acceleration LG. Specifically, the vehicle body speed estimation part 61 estimates a variation component which is included in the vehicle body speed and is due to acceleration/deceleration operations by the driver. For details of the function of the vehicle body speed estimation part 61, see paragraphs 0056 to 0069, FIG. 8, and others of Patent Literature 1 (Japanese Patent Publication No. 2016-22830), which is referenced in the Background Art section presented above. The description relevant to the "vehicle body speed estimation part" disclosed in Patent Literature 1 is hereby incorporated in the present application by reference, as if it were set forth in its entirety herein.

Information on the variation component in the vehicle body speed, estimated by the vehicle body speed estimation part 61, is transmitted to the multiplier part 65 provided at a succeeding stage.

The inner/outer wheel turn radius ratio estimation part 63 has a function to estimate inner/outer wheels turn radius ratios on the basis of the yaw rate YR. The inner/outer wheels turn radius ratios mean: a ratio of the turn radius of one inner wheel of the vehicle 10 to the turn radius of the vehicle body of the vehicle 10; a ratio of the turn radius of the other inner wheel of the vehicle 10 to the turn radius of the vehicle body of the vehicle 10; a ratio of the turn radius of one outer wheel of the vehicle 10 to the turn radius of the vehicle body of the vehicle 10; and a ratio of the turn radius of the other outer wheel of the vehicle 10 to the turn radius of the vehicle body of the vehicle 10. The inner/outer wheel turn radius ratio estimation part 63 estimates the inner/outer wheels turn radius ratios as basic information to be used to calculate (estimate), at the adder/subtractor part 67, a variation component which is included in the wheel speed variation amount and is due to a steering operation by the driver.

For details of the function of the inner/outer wheel turn radius ratio estimation part 63, see paragraphs 0056 to 0074, FIGS. 8, 10, and 11, and others of Patent Literature 1, which is referenced in the Background Art section presented above. The description relevant to the "steering correction amount calculation part 53" presented in Patent Literature 1 is incorporated herein as a description presented in the present application.

The information on the inner/outer wheels turn radius ratios, estimated by the inner/outer wheel turn radius ratio estimation part 63, is transmitted to the multiplier part 65 provided at a succeeding stage.

The multiplier part 65 multiplies the information on the variation component in the vehicle body speed, estimated by the vehicle body speed estimation part 61, and the information on the inner/outer wheels turn radius ratios, estimated by the inner/outer wheel turn radius ratio estimation part 63. The information on the result of the multiplication by the multiplier part 65 is transmitted to the adder/subtractor part 67 provided at a succeeding stage.

The first wheel speed variation amount estimation part 71 estimates a variation component which is included in the wheel speed variation amount and is due to a sprung pitch amount.

Here, a description will be given of a mechanism that causes a fluctuation (variation) which is included in the wheel speed variation amount and is due to a sprung pitch amount, by exemplifying a front wheel of the vehicle 10 with reference to FIG. 5A.

Assume that the vehicle 10 is traveling forward on a wavy road 91 which causes a pitching action of the vehicle about the mass center 88 of the vehicle body. The wheel speed sensor 55 that detects a wheel speed signal is disposed on a knuckle 93 located at an unsprung position, i.e., located under a spring member of the suspension.

In the case where the vehicle 10 is traveling forward on the wavy road 91 which causes pitching actions of the vehicle 10, a pitching action occurs under the spring member of the suspension due to the pitching action of the vehicle body. As a result, the wheel speed signal, which is detected under the spring member of the suspension, includes a component which corresponds to an unsprung pitch rate and is superimposed in an original wheel speed signal (time-series data of wheel speed variation). (Here, the unsprung pitch rate means a pitching amount under the spring member of the suspension per a unit time. The unsprung pitch rate has a dimension of deg/s.) That is, a noise signal is mixed in the original wheel speed signal. Consequently, a noise signal is mixed also in the wheel speed variation amount calculated on the basis of the wheel speed signal.

In particular, in a case where a relatively large pitching action occurs on the sprung member (vehicle body), the correlation (approximate direct proportional relationship) of the ground contact load variation amount to the wheel speed variation amount is impaired. As a result, when a ground contact load variation amount corresponding to a wheel speed variation amount is obtained by consulting a predetermined conversion map, a ground contact load correlation value, which is basic information used in estimating a stroke speed, includes an error.

For this reason, it is difficult to perform damping control of the electromagnetic actuator 13 with high accuracy. Consequently, the ride quality of the vehicle 10 could be deteriorated.

In view of this, the first wheel speed variation amount estimation part 71 is configured to calculate a sprung pitch amount on the basis of sprung pitch-related information detected by the 3D gyro sensor 51 (sprung state amount detection part) and to estimate a variation component in the wheel speed variation amount on the basis of the calculated sprung pitch amount. Here, the sprung pitch amount means an amount of the pitching that occurs on the sprung member (vehicle body). The information on the variation component in the wheel speed variation amount, which is due to the sprung pitch amount estimated by the first wheel speed variation amount estimation part 71, is transmitted to the adder part 75 provided at a succeeding stage.

The first wheel speed variation amount estimation part 71 is a part of the "wheel speed variation amount correction part" of the present invention.

The second wheel speed variation amount estimation part 73 estimates a variation component which is included in the wheel speed variation amount and is due to suspension strokes.

Here, a description will be given of a mechanism that causes fluctuation (variation) in the wheel speed variation amount due to a suspension stroke, by exemplifying a front wheel with reference to FIG. 5B.

Assume that the vehicle 10 is traveling forward and that a suspension stroke related to bumping or rebounding of the vehicle 10 with respect to a 1-G state of the vehicle 10 is occurring. In the case of rebounding, as illustrated in FIG. 5B, the rotational direction of the front wheel, i.e., the direction of the wheel speed, and the direction of the pitching action are the same. In this case, a fluctuation (variation) in the wheel speed variation amount occurs such that the wheel speed increases.

On the other hand, in the case of bumping, as illustrated in FIG. 5B, the rotational direction of the front wheel, i.e., the direction of the wheel speed, is opposite to the direction of the pitching action. In this case, a fluctuation (variation) in the wheel speed variation amount occurs such that the wheel speed decreases.

In short, when a suspension stroke occurs, a noise signal is mixed with the original wheel speed signal. Consequently, a noise signal is mixed also in the wheel speed variation amount calculated on the basis of a wheel speed signal.

For this reason, it is difficult to perform damping control of the electromagnetic actuator 13 with high accuracy. Consequently, the ride quality of the vehicle 10 may be deteriorated.

In view of this, the second wheel speed variation amount estimation part 73 is configured to estimate a variation component which is included in the wheel speed variation amount and is generated when a stroke of the electrically powered suspension system 11 (suspension) occurs, on the basis of a stroke speed estimation value outputted by the estimation model 83. The information on the variation component in the wheel speed variation amount, which is due to the suspension stroke estimated by the second wheel speed variation amount estimation part 73, is transmitted to the adder part 75 provided at a succeeding stage.

The second wheel speed variation amount estimation part 73 is a part of the "wheel speed variation amount correction part" of the present invention.

The adder part 75 adds together the information on the variation component which is included in the wheel speed variation amount and is due to the sprung pitch amount estimated by the first wheel speed variation amount estimation part 71 and the information on the variation component which is included in the wheel speed variation amount and is due to the suspension stroke estimated by the second wheel speed variation amount estimation part 73. The information on the result of the addition by the adder part 75 is transmitted to the adder/subtractor part 67 provided at a succeeding stage.

The adder part 75 is apart of the "wheel speed variation amount correction part" of the present invention.

The sprung speed calculation part 77 calculates a sprung speed on the basis of the sprung state amounts (information on the sprung pitch rate PV, the sprung roll rate RV, and the up-down acceleration VG) detected by the 3D gyro sensor 51 (sprung state amount detection part).

The subtractor part 79 subtracts the sprung speed estimation value, obtained on the basis of the stroke speed estimation value outputted by the estimation model 83, from the sprung speed calculation value obtained by the sprung speed calculation part 77, to calculate an estimation error of the sprung speed value. The sprung speed estimation error calculated by the subtractor part 79 is transmitted to the PID 80.

The subtractor part 79 corresponds to the "estimation error calculation part" of the present invention.

The PID 80 performs a control on the "sprung speed estimation error calculated by the subtractor part 79", which is an input value, using as appropriate the following three control methods: a Proportional (P) control performed on the basis of a control deviation between a target value and an output value; an Integral (I) control that varies the input value in proportional to an integral of the control deviation; and a Derivative (D) control that varies the input value in proportional to a differential of the control deviation.

The PID 80 of the present embodiment multiplies the "sprung speed estimation error calculated by the subtractor part 79", which is the input value, by a P gain according to the P control and by a D gain according to the D control. The result of the arithmetic operation by the PID 80, which is used as a load value to be inputted to the estimation model 83, is transmitted to the adder part 82 provided at a succeeding stage.

The adder/subtractor part 67 subtracts the result of the multiplication by the multiplier part 65 (a variation component included in the wheel speed variation amount and being due to the acceleration/deceleration operation and the steering operation by the driver) and the result of the addition by the adder part 75 (a variation component included in the wheel speed variation amount and being due to the sprung pitch amount and the suspension stroke), from the wheel speed correlation value (including the concept of wheel speed variation amount) based on the wheel speed WS detected by the wheel speed sensor 55. With this operation, the adder/subtractor part 67 outputs a wheel speed correlation value (wheel speed variation amount) after a correction that removes influences of the variation component which is included in the wheel speed variation amount and is due to the acceleration/deceleration operation and the steering operation by the driver and removes influences of the variation component which is included in the wheel speed variation amount and is due to the sprung pitch amount and the suspension stroke.

The result of addition and subtraction by the adder/subtractor part 67, i.e., the wheel speed variation amount after the correction, is transmitted to the conversion part 81 provided at a succeeding stage.

The adder/subtractor part 67 is in charge of a part of the function of the "wheel speed variation amount correction part" of the present invention, in coordination with the first wheel speed variation amount estimation part 71, the second wheel speed variation amount estimation part 73, the adder part 75, the sprung speed calculation part 77, the subtractor part 79, the PID 80, and the adder part 82.

The conversion part 81 converts the corrected wheel speed variation amount, which has been corrected to remove the influences due to the acceleration/deceleration operation and the steering operation by the driver and the influences due to the sprung pitch amount and the suspension stroke, to a variation amount in the ground contact load u1 (see FIG. 5C). This conversion can be performed by, for example, multiplying the value of the corrected wheel speed variation amount by a proportional constant k.

The ground contact load u1 outputted by the conversion part 81 is inputted into the adder part 82.

The adder part 82 adds together the information on the ground contact load u1 outputted by the conversion part 81 and the information on the result of the arithmetic operation by the PID 80 on the "sprung speed estimation error calculated by the subtractor part 79". With this operation, the information represented by the result of the addition by the adder part 82 represents a value that takes into account: the variation component which is included in the wheel speed variation amount and is due to the acceleration/deceleration operation and the steering operation by the driver; the variation component which is included in the wheel speed variation amount and is due to the sprung pitch amount and the suspension stroke; and influences due to the sprung speed estimation error. The information on the result of the addition by the adder part 82 is transmitted to the estimation model 83 provided at a succeeding stage.

The estimation model 83 is, for example, based on an up-down two degree of freedom, one-wheel model illustrated in FIG. 5C. According to the estimation model 83, a spring member 46 (spring constant k1) constituted by a tire is arranged between a road surface 44 and an unsprung member 47 (unsprung mass m1). In addition, a spring member 48 (spring constant k2) and the electromagnetic actuator 13 are arranged in parallel between the unsprung member 47 and a sprung member 49 (sprung mass m2).

According to the estimation model 83, when the road surface variation is denoted x0, the ground contact load is denoted u1, the unsprung position of the unsprung member 47 is denoted x1, the unsprung speed dx1/dt is denoted s1, the damping load of the electromagnetic actuator 13 is denoted u2, the sprung position of the sprung member 49 is denoted x2, and the sprung speed dx2/dt is denoted s2, the suspension stroke speed s3 is represented as: s3=s2−s1.

There is a first correlation (approximate direct proportional relationship) between the ground contact load u1 and the wheel speed correlation value (wheel speed variation amount). There is a second correlation (approximate direct proportional relationship) between the wheel speed correlation value (wheel speed variation amount) and the suspension stroke speed s3.

The estimation model 83 outputs an estimation value of the sprung speed s2 (sprung speed estimation value) and an estimation value of the suspension stroke speed s3 (stroke speed estimation value), on the basis of the first and second correlations and the ground contact load u1.

The estimation model 83 corresponds to the "stroke speed estimation part" of the present invention.

The stroke speed estimation value obtained in this way is fed back to the second wheel speed variation amount estimation part 73 to be used as basic information used in estimating a variation component which is included in the wheel speed variation amount and is due to suspension strokes.

In addition, the sprung speed estimation value is fed back to the subtractor part 79 to be used as basic information used in calculating the sprung speed estimation error.

[Operation of Electrically Powered Suspension System 11]

Next, a description will be given of the operations of the electrically powered suspension system 11 according to the embodiment of the present invention with reference to FIG. 6. FIG. 6 is a flowchart for explaining operations of the electrically powered suspension system 11.

The flowchart illustrated in FIG. 6 represents a sequence of process flow steps in a time unit (cycle time) for the electromagnetic actuator 13 provided to each wheel.

At step S11 illustrated in FIG. 6, the information acquisition part 41 of the damping control ECU 15 acquires various pieces of information including the up-down acceleration VG, the sprung pitch rate PV, the sprung roll rate RV, the preview image PRI, the wheel speed WS, the longitudinal acceleration LG, the yaw rate YR, the stroke position of the electromagnetic actuator 13, and the motor current for the electric motor 31.

At step S12, the target damping force computation part 43 of the damping control ECU 15 performs a wheel speed correction processing described next.

<Wheel speed Correction Processing>

The wheel speed variation amount calculation part 60 calculates a wheel speed variation amount on the basis of the wheel speed detection values detected by the wheel speed sensor 55. The information on the wheel speed variation amount calculated by the wheel speed variation amount calculation part 60 is transmitted to the adder/subtractor part 67.

The vehicle body speed estimation part 61 estimates, on the basis of the longitudinal acceleration LG, a vehicle body speed variation component due to the acceleration/deceleration operations by the driver. The information on the vehicle body speed variation component estimated by the vehicle body speed estimation part 61 is transmitted to the multiplier part 65.

The inner/outer wheel turn radius ratio estimation part 63 estimates, for the corresponding wheel, the inner/outer wheels turn radius ratio as basic information used to calculate (estimate) the variation component which is included in the wheel speed variation amount and is due to the steering operation by the driver. The information on the inner/outer wheels turn radius ratio, estimated by the inner/outer wheel turn radius ratio estimation part 63, is transmitted to the multiplier part 65.

The multiplier part 65 multiplies the information on the vehicle body speed variation component, estimated by the vehicle body speed estimation part 61, and the information on the inner/outer wheels turn radius ratio, estimated by the inner/outer wheel turn radius ratio estimation part 63. The information on the result of the multiplication by the multiplier part 65 is transmitted to the adder/subtractor part 67.

The first wheel speed variation amount estimation part 71 estimates a variation component which is included in the wheel speed variation amount and is due to a sprung pitch amount. The information on the variation component, which is included in the wheel speed variation amount and is due to the sprung pitch amount estimated by the first wheel speed variation amount estimation part 71, is transmitted to the adder part 75.

The second wheel speed variation amount estimation part 73 estimates a variation component which is included in the wheel speed variation amount and is due to suspension strokes. The information on the variation component, which is included in the wheel speed variation amount and is due to the suspension stroke estimated by the second wheel speed variation amount estimation part 73, is transmitted to the adder part 75.

The adder part 75 adds together the information on the variation component which is included in the wheel speed variation amount and is due to the sprung pitch amount estimated by the first wheel speed variation amount estimation part 71 and the information on the variation component which is included in the wheel speed variation amount and is due to the suspension stroke estimated by the second wheel speed variation amount estimation part 73. The information on the result of the addition by the adder part 75 is transmitted to the adder/subtractor part 67.

The sprung speed calculation part 77 calculates a sprung speed on the basis of sprung state amounts (information on the sprung pitch rate PV, the sprung roll rate RV, and the up-down acceleration VG) detected by the 3D gyro sensor 51 (sprung state amount detection part).

The subtractor part 79 subtracts the sprung speed estimation value, obtained on the basis of the stroke speed estimation value outputted by the estimation model 83, from the sprung speed calculation value obtained by the sprung speed calculation part 77, to calculate an estimation error of the sprung speed value. The sprung speed estimation error calculated by the subtractor part 79 is transmitted to the PID 80.

The adder/subtractor part 67 subtracts the result of the multiplication by the multiplier part 65 (the variation component included in the wheel speed variation amount and being due to the acceleration/deceleration operation and the steering operation by the driver) and the result of the addition by the adder part 75 (the variation component included in the wheel speed variation amount and being due to the sprung pitch amount and the suspension stroke) from the wheel speed variation amount (wheel speed correlation value) calculated by the wheel speed variation amount calculation part 60.

Obtained by this operation is a wheel speed variation amount (wheel speed correlation value) after the correction that removes influences of the variation component which is included in the wheel speed variation amount and is due to the acceleration/deceleration operation and the steering operation by the driver and removes influences of the variation component which is included in the wheel speed variation amount and is due to the sprung pitch amount and the suspension stroke.

Described up to here is about the wheel speed correction processing (except the correction that removes the sprung speed estimation error).

At step S13, the conversion part 81, which belongs to the target damping force computation part 43 of the damping control ECU 15, converts the wheel speed variation amount which has been corrected to remove the influences due to the acceleration/deceleration operation and the steering operation by the driver and the influences due to the sprung pitch amount and the suspension stroke, to a variation amount in the ground contact load u1.

The information on the result of the arithmetic operation by the PID 80 on the "sprung speed estimation error calculated by the subtractor part 79" is added by the adder part 82 to the information on the variation amount in the ground contact load u1 after conversion by the conversion part 81. With this operation, the result of the addition by the adder part 82 is a value that takes into account: the influences due to the acceleration/deceleration operation and the steering operation by the driver; the influences due to the sprung pitch amount and the suspension stroke; and the influences due to the sprung speed estimation error.

At step S14, the estimation model 83, which belongs to the target damping force computation part 43 of the damping control ECU 15, outputs an estimation value of the sprung speed s2 and an estimation value of the suspension stroke speed s3, on the basis of the above-described first and second correlations and on the basis of the adder part 82's addition result including information on (the variation amount of) the ground contact load u1 obtained by the conversion part 81.

The stroke speed estimation value obtained in this way is fed back to the second wheel speed variation amount estimation part 73 to be used as basic information used in estimating the variation component which is in the wheel speed variation amount and is due to the suspension stroke.

In addition, the sprung speed estimation value is fed back to the subtractor part 79 to be used as basic information used in calculating the estimation error of the sprung speed.

At step S15, the damping control part 45 of the damping control ECU 15 performs damping control of the electromagnetic actuator 13, on the basis of the estimated stroke speed. After that, the damping control ECU 15 finishes the sequence of process flow steps including the wheel speed correction processing (step S12), which is a major part of the present invention.

[Advantageous Effects of Electrically Powered Suspension System 11]

A prerequisite condition of an electrically powered suspension system 11 according to a first aspect is that the electrically powered suspension system 11 includes: an actuator (electromagnetic actuator 13) provided between a vehicle body and a wheel of a vehicle 10 and configured to generate a damping force for damping vibration of the vehicle body; a stroke speed estimation part (estimation model 83) configured to estimate a stroke speed of a suspension; and a damping control part 45 configured to perform damping control of the electromagnetic actuator 13 on the basis of the stroke speed estimated by the estimation model 83.

The electrically powered suspension system 11 according to the first aspect further includes: a wheel speed detection part (wheel speed sensor 55) provided at an unsprung position of the vehicle 10 and configured to detect the wheel speed of the corresponding wheel; a wheel speed variation amount calculation part 60 configured to calculate a wheel speed variation amount on the basis of wheel speed detection values detected by the wheel speed sensor 55; a sprung state amount detection part (3D gyro sensor 51) provided at a sprung position of the vehicle 10 and configured to detect sprung state amounts including sprung pitch-related information relevant to sprung pitching actions; and a wheel speed variation amount correction part (adder/subtractor part 67, first wheel speed variation amount estimation part 71, second wheel speed variation amount estimation part 73, adder part 75, sprung speed calculation part 77, and subtractor part 79) configured to: calculate a sprung pitch amount on the basis of the sprung pitch-related information detected by the sprung state amount detection part; estimate a variation component in the wheel speed variation amount on the basis of the calculated sprung pitch amount; and correct the wheel speed variation amount calculated by the wheel speed variation amount calculation part 60 so as to reduce the estimated variation component in the wheel speed variation amount.

The stroke speed estimation part (estimation model 83) estimates a stroke speed of the suspension on the basis of the wheel speed variation amount corrected by the wheel speed variation amount correction part.

The wheel speed variation amount correction part (adder/subtractor part 67, first wheel speed variation amount estimation part 71, second wheel speed variation amount estimation part 73, adder part 75, sprung speed calculation part 77, and subtractor part 79) of the electrically powered suspension system 11 according to the first aspect estimates a variation component in the wheel speed variation amount on the basis of the sprung pitch amount and corrects the wheel speed variation amount calculated by the wheel speed variation amount calculation part 60 so as to reduce the estimated variation component in the wheel speed variation amount (the reduction may completely remove the estimated variation component in the wheel speed variation amount).

In short, the wheel speed variation amount correction part performs a correction that reduces, from the wheel speed variation amount calculated on the basis of the wheel speed detection values, the variation component which is included in the wheel speed variation amount and is due to a pitching action (sprung pitch amount). The stroke speed estimation part estimates the stroke speed of the suspension on the basis of the corrected wheel speed variation amount. The damping control part 45 performs damping control on the actuator (electromagnetic actuator 13), on the basis of the estimated stroke speed.

The electrically powered suspension system 11 according to the first aspect performs a correction that reduces, from the wheel speed variation amount calculated on the basis of the wheel speed detection values, the variation component which is included in the wheel speed variation amount and is due to a pitching action (sprung pitch amount), and estimates the stroke speed of the suspension on the basis of the corrected wheel speed variation amount with high accuracy. As a result, even when the vehicle 10 is traveling on a wavy road which causes pitching actions of the vehicle 10, it is possible to keep the ride quality at a comfortable level.

An electrically powered suspension system 11 according to a second aspect is the electrically powered suspension system 11 according to the first aspect, wherein the wheel speed variation amount correction part (adder/subtractor part 67, first wheel speed variation amount estimation part 71, second wheel speed variation amount estimation part 73, adder part 75, sprung speed calculation part 77, and subtractor part 79) is configured to correct the wheel speed variation amount calculated by the wheel speed variation amount calculation part 60, so as to reduce a variation component which is included in the wheel speed variation amount and is generated when a stroke of the suspension occurs.

The wheel speed variation amount correction part of the electrically powered suspension system 11 according to the second aspect performs a correction that reduces, from the wheel speed variation amount calculated on the basis of the wheel speed detection values, a variation component which is included in the wheel speed variation amount and is due to suspension strokes.

Accordingly, the variation component which is included in the wheel speed variation amount and is due to the suspension strokes is reduced from the wheel speed variation amount calculated on the basis of the wheel speed detection values. This means an increase in the accuracy of the wheel speed variation amount, which is basic information to be used in estimating the stroke speed of the suspension.

The electrically powered suspension system 11 according to the second aspect makes it possible to increase the accuracy of the wheel speed variation amount, which is basic information to be used in estimating the stroke speed of the suspension and thus improves the effect of keeping the ride quality at a comfortable level compared to the electrically powered suspension system 11 according to the first aspect.

An electrically powered suspension system 11 according to a third aspect is the electrically powered suspension system 11 according to the first or second aspect, further including: a sprung speed calculation part 77 configured to calculate a sprung speed on the basis of sprung state amounts detected by a 3D gyro sensor 51 (sprung state amount detection part); and an estimation error calculation part (subtractor part 79) configured to calculate a sprung speed estimation error on the basis of the sprung speed calculated by the sprung speed calculation part 77 and a sprung speed estimated on the basis of the stroke speed estimated by the stroke speed estimation part (estimation model 83).

The stroke speed estimation part estimates the stroke speed of the suspension so that the sprung speed estimation error calculated by the estimation error calculation part (subtractor part 79) becomes small.

The estimation error calculation part (subtractor part 79) of the electrically powered suspension system 11 according to the third aspect calculates the sprung speed estimation error on the basis of the sprung speed calculated by the sprung speed calculation part 77 and the sprung speed estimated on the basis of the stroke speed estimation value estimated by the stroke speed estimation part (estimation model 83). The stroke speed estimation part estimates the stroke speed of the suspension so that the sprung speed estimation error calculated by the estimation error calculation part (subtractor part 79) becomes small.

The stroke speed estimation part of the electrically powered suspension system 11 according to the third aspect estimates the stroke speed of the suspension so that the sprung speed estimation error calculated by the estimation error calculation part (subtractor part 79) becomes small and thus improves further the effect of keeping the ride quality at a comfortable level compared to the electrically powered suspension system 11 according to the first aspect and the electrically powered suspension system 11 according to the second aspect.

Other Modifications

The plurality of embodiments described above represent examples of embodying the present invention. Therefore, the technical scope of the present invention should not be construed to be limited to these embodiments. The present invention can be implemented in various embodiments without departing from the gist or the main scope of the present invention.

For example, the electrically powered suspension systems 11 according to the embodiments of the present invention have been described with an exemplary embodiment in which a total of four electromagnetic actuators 13 are arranged for both the front wheels (front left wheel and front right wheel) and the rear wheels (rear left wheel and rear right wheel). However, the present invention is not limited to this configuration. A total of two electromagnetic actuators 13 may be arranged in either the front wheels or the rear wheels.

In addition, the electrically powered suspension systems 11 according to the embodiments of the present invention have been described such that a damping control part 45 performs damping control on each of a plurality of electromagnetic actuators 13 separately.

Specifically, the damping control part 45 is configured to perform damping control on each of electromagnetic actuators 13 provided respectively on the four wheels, separately.

Alternatively, the damping control part 45 may be configured to perform damping control of electromagnetic actuators 13 provided respectively on the four wheels, separately for the front wheels and for the rear wheels, or separately for the right wheels and the left wheels.

What is claimed is:

1. An electrically powered suspension system including an actuator, the actuator being provided between a vehicle body and a wheel of a vehicle and configured to generate a damping force for damping vibration of the vehicle body, the electrically powered suspension system comprising:
   a wheel speed detection part provided at an unsprung position of the vehicle and configured to detect a wheel speed of the wheel;
   a wheel speed variation amount calculation part configured to calculate a wheel speed variation amount on the basis of wheel speed detection values detected by the wheel speed detection part;
   a sprung state amount detection part provided at a sprung position of the vehicle and configured to detect sprung state amounts including sprung pitch-related information relevant to a sprung pitching action;
   a first wheel speed variation amount estimation part configured to calculate a sprung pitch amount on the basis of the sprung pitch-related information detected by the sprung state amount detection part and to estimate a first variation component in the wheel speed variation amount based on the sprung pitch amount calculated, the first variation component being due to the sprung pitch amount;
   a second wheel speed variation amount estimation part configured to estimate a second variation component in the wheel speed variation amount, the second variation component generated when a stroke of a suspension occurs;
   a wheel speed variation amount correction part configured to correct the wheel speed variation amount calculated by the wheel speed variation amount calculation part;
   a stroke speed estimation part configured to estimate a stroke speed of the suspension on the basis of the wheel speed variation amount corrected by the wheel speed variation amount correction part; and
   a damping control part configured to perform damping control of the actuator on the basis of the stroke speed estimated by the stroke speed estimation part,
   wherein the second wheel speed variation amount estimation part estimates the second variation component based on the stroke speed estimated by the stroke speed estimation part, and
   wherein the wheel speed variation amount correction part corrects the wheel speed variation amount calculated by the wheel speed variation amount calculation part by subtracting the first variation component and the second variation component from the wheel speed variation amount calculated by the wheel speed variation amount calculation part.

2. The electrically powered suspension system according to claim 1, further comprising:
   a sprung speed calculation part configured to calculate a sprung speed on the basis of the sprung state amounts detected by the sprung state amount detection part; and
   an estimation error calculation part configured to calculate a sprung speed estimation error on the basis of the sprung speed calculated by the sprung speed calculation part and a sprung speed estimated on the basis of the stroke speed estimation value estimated by the stroke speed estimation part, wherein the stroke speed estimation part estimates the stroke speed so that the sprung speed estimation error calculated by the estimation error calculation part becomes small.

* * * * *